Patented Oct. 12, 1943

2,331,338

UNITED STATES PATENT OFFICE 2,331,338

PROCESS FOR THE THERMAL TREATMENT OF CARBONACEOUS MATERIAL

Wilhelm Michael, Ludwigshafen-on-the-Rhine, Otto Goehre, Heidelberg, Gerhard Free and Wilhelm v. Fuener, Ludwigshafen-on-the-Rhine, and Wilhelm Schneider, Mannheim, Germany; vested in the Alien Property Custodian No Drawing. Original application July 30, 1938, Serial No. 222,144. Divided and this application July 13, 1940, Serial No. 345,367. In Germany August 9, 1937

6 Claims. (Cl. 196—52)

The present invention relates to a process for the thermal treatment of carbonaceous material.

We have found that highly efficient catalysts for the thermal treatment of carbonaceous materials, more particularly for the splitting of these materials, are obtained by mixing moist mineral gels with a metal salt solution and heating the mixture, if desired after the addition of a precipitant.

The gels are prepared from the solution of these salts of the elements of the 3rd and 4th groups of the periodic system which are capable of forming gels, especially of silicon, titanium, zirconium, thorium, cerium or aluminum, by the addition of suitable precipitants, as for example acids or salts.

The catalyst may be prepared by mixing the gel, preferably a silica gel, precipitated from a silicate solution or a mixture of several gels with a solution of one or several metal salts, especially salts of the metals of the 2nd to the 8th groups of the periodic system, and more particularly of magnesium or aluminum, of titanium, tin, zinc, and the metals of the 5th, 6th or the iron group and then heating the mixture in order to eliminate the whole or the bulk of the moisture. For this purpose the mixture may for example be evaporated to dryness, whereupon heating is preferably continued up to temperatures of 50° C., or even higher, say of the range of from 300 to 400° C., in order that the metal salts deposited on the gel are converted into other compounds.

The mixture of gel and metal salt solution may also be evaporated at about 100° C., filtered, prior to dryness washed, if desired, for removing the precipitant employed for the preparation of the gel, then dried and, if desired, heated up to a higher temperature.

The gel may also, before the addition of the metal salt solution, be freed from the precipitant and then further used in the manner described.

The precipitant may also be added to the gel before the addion of the metal salt solution. It is not necessary to separate the gel from the aqueous liquid prior to adding the metal salt solution or the precipitant.

The catalysts may also be prepared by mixing of solutions of gel-forming substances with solutions of one or more metal salts without practically any precipitation taking place and subsequently adding one or more precipitants to the mixture. The formation of a precipitate is avoided in known manner for example by the addition of acids, such as dilute hydrochloric acid. The precipitant should be capable of precipitating both the gel and the metal salt. For this reason it is sometimes necessary to use more than one precipitant. The precipitant may also be added in such manner that for example the agent promoting formation of the gel is first added and then the agent serving to precipitate the metal salt.

The preparation of the catalyst may also be carried out in the presence of bleaching earths or bauxite or similar substances.

The gel is filtered off from the solution along with the metal compound precipitated, washed for removing particularly the alkaline precipitant and dried. It may be advantageous to expose the catalyst to high temperatures if desired in the presence of reducing gases before its use, for example by slowly heating it to from 450° to 800° C.

The gel and the metal salt solution are mixed in such a proportion that the catalyst contains from about 10 to 98 per cent, for instance from 60 to 90 per cent of the gel. For the cracking and destructive or refining hydrogenation processes such catalysts are very suitable as contain from about 10 to 75 per cent, preferably from 30 to 75 per cent of gel. When using for the preparation of such a catalyst silica as gel and alumina as gel or as the metallic component, if desired together with other gel-forming or metallic substances, the ratio of $SiO_2$ to $Al_2O_3$ may be less than about 75 to 25.

The following table shows for example the metallic constituents of catalysts suitable for the thermal treatment of carbonaceous material, prepared in the said manner, but the invention is not restricted to the use of these catalysts.

Si—Mg
Si—Al
Si—Mg—Al
Al—Mg
Si
Si—Mg
Si—Al
Si—Mg—Al
Al
Al—Mg

Together with one or more of the following metals: Zn, Sn, Ti, V, Cr, Mo, W, Fe, Ni and Co.

The catalyst may also be mixed with carbonaceous substances, as for example graphite or lignite small coke, shaped and then heated to from about 500° to 600° C.

The catalyst thus obtained contains the metal compound in a state of fine distribution within the gel. If the gel is mixed with a metal compound previously precipitated, a catalyst is obtained having only a poor efficiency, even when the mixing is done while intensely stirring.

Another advantage in the catalyst prepared according to the present invention resides in the fact that its efficiency can be easily restored to the full initial value by a treatment, for example with oxidizing gases, at an elevated temperature.

This treatment may be carried out at high temperatures up to about 800° C. whereas when regenerating siliceous catalysts not obtained by precipitation from solutions of gel-forming substances, for example natural bleaching earths, temperatures surpassing about 500° C. must not be employed as otherwise the catalyst would be damaged. The maintenance of such a low temperature in regenerating the catalyst wherein exothermic reactions take place is only possible with a careful control of the temperature and of the oxygen content of the oxidizing gases used and is therefore very troublesome.

In the cracking and hydrogenation processes the formation of gaseous substances is considerably reduced by the use of the said catalysts if the metal or metal compounds are completely or partially dissolved out for instance with the aid of inorganic or organic acids. The resulting product is then freed from acid, preferably by washing, dried and brought into a suitable shape.

The efficiency of the catalyst may be still further increased by an addition of boric acid. The use of the latter type of catalyst results in a specially high output of a highly anti-knock benzine.

The boric acid may be added to the gel in a solid or liquid form either before or after the addition of the metal salt solution or the precipitant, or after the filtration, or before or during the heating.

The amount of boric acid added may vary within wide limits, the preferred amount being from 0.5 to 30 per cent calculated with reference to the dry mixture of gel and metal compound.

The catalysts claimed or mixtures thereof are especially adapted for use in splitting carbonaceous materials, such as mineral oils, tars, extraction products of solid carbonaceous materials, cracked products, destructive hydrogenation products of coal, tars, mineral oils or wood, or oils produced synthetically from carbon monoxide and hydrogen, as well as fractions of the said oils. The splitting is preferably carried out at temperatures of between about 300 and 700° C. or more, at ordinary, reduced or increased pressure, for example at between 10 and 200 atmospheres, if desired in the presence of gases, such as hydrogen, steam, nitrogen or oxides of carbon.

The catalysts are also very suitable for the hydrogenation of the said substances particularly when working at pressures above 300 atmospheres, for instance 400 to 800 atmospheres. In this case preferably a catalyst is used containing silica and alumina and if desired in addition thereto metals as magnesium, iron, cobalt, nickel, tungsten, molybdenum, chromium, manganese, vanadium or uranium or their compounds in amounts from 0.5 to 25 per cent or more.

When using as initial materials for cracking or hydrogenation processes hydrocarbons very rich in hydrogen for instance hydrocarbons obtained by the reaction of carbon monoxide with hydrogen, pure paraffin-basic petroleums or hydrocarbons rich in hydrogen obtained by pressure hydrogenation and/or with the aid of selective solvents and which contain at least 15 grams of hydrogen for each 100 grams of carbon, or fractions of the said substances, not only is a good yield of benzine obtained but there is only a relatively small formation of gas if multi-component catalysts are used which have been prepared in the said manner by mixing gel substances with a magnesium salt solution. A catalyst containing mainly magnesia and silicic acid and preferably also a small amount of zinc is especially suitable.

Other thermal treatments of carbonaceous substances for which the said catalysts are suitable are the polymerization, alkylation, isomerizing, desulphurizing and refining of hydrocarbon oils.

The following example will further illustrate how the said invention may be carried out in practice but the invention is not restricted to this example. The parts are by weight unless otherwise stated.

*Example*

1.5 kilograms of 28 per cent waterglass solution are diluted to 10 litres with water and then a solution of 650 grams of ferric chloride

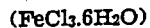
(FeCl$_3$.6H$_2$O)

in 2 litres of water is added while stirring. The resulting precipitate is separated by filtration, washed, dried by heating to about 40° C. and then washed with 10 per cent hydrochloric acid until there is no further yellow coloration of the acid. The residue containing silicic acid is then washed with water until it is free from acid, dried by heating to about 100° C., shaped and exposed to a temperature of 400° C.

If this catalyst be used for splitting for example a middle oil fraction prepared from hydrogen and carbon monoxide, the formation of hydrocarbons containing three and four carbon atoms is from about 30 to 40 per cent less than with known splitting catalysts containing silicon, as for example aluminum hydrosilicates.

This application has been divided out of application Ser. No. 222,144, filed July 30, 1938.

What we claim is:

1. In a process for cracking a hydrocarbon oil at a temperature between 300 and 700° C. in the presence of a catalyst obtained by heating to a temperature of at least 250° C. an initially moist non-alkaline mixture of silica hydrogel and at least one catalytically acting metal compound, the improvement which comprises re-dissolving with acids at least a substantial portion of the catalytically acting metal compound as the final step in establishing the composition of the catalyst.

2. A process according to claim 1 in which the non-alkaline mixture of silica hydrogel and a catalytically acting metal compound is obtained by mixing a silica gel-forming solution with at least one catalytically acting metal compound.

3. A process according to claim 1 in which the non-alkaline mixture of silica hydrogel and a catalytically acting metal compound is obtained by mixing silica hydrogel with at least one catalytically acting metal compound.

4. A process according to claim 1 in which a substantial portion of the catalytically acting metal compound is re-dissolved after heating the mixture.

5. A process according to claim 1 in which the catalytically acting metal compound is re-dissolved until the washing acid remains free of ions of the catalytically acting metal.

6. In a process for cracking a hydrocarbon oil at a temperature between 300 and 700° C. in the presence of a catalyst obtained by heating to a temperature of at least 250° C. an initially moist non-alkaline mixture of silica hydrogel and at least one catalytically acting metal compound, the improvement which comprises drying said initially moist non-alkaline mixture, re-dissolving with acids at least a substantial portion of the catalytically acting metal compound, washing, and heating the product to said temperature of at least 250° C.

WILHELM MICHAEL.
OTTO GOEHRE.
GERHARD FREE.
WILHELM v. FUENER.
WILHELM SCHNEIDER.